(12) United States Patent
Mahnad

(10) Patent No.: US 8,514,675 B2
(45) Date of Patent: Aug. 20, 2013

(54) SUSPENSION SYSTEM FOR AN OPTICAL PICKUP ASSEMBLY

(75) Inventor: Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 148 days.

(21) Appl. No.: 13/105,481

(22) Filed: May 11, 2011

(65) Prior Publication Data

US 2012/0291055 A1    Nov. 15, 2012

(51) Int. Cl.
*G11B 7/00* (2006.01)

(52) U.S. Cl.
USPC ............... 369/44.16; 369/44.37; 720/682

(58) Field of Classification Search
USPC ..... 369/44.14–44.16, 44.32, 53.19; 720/672, 720/681–687; 386/320
See application file for complete search history.

(56) References Cited

U.S. PATENT DOCUMENTS

| | | | |
|---|---|---|---|
| 4,538,882 A | 9/1985 | Tanaka et al. | |
| 4,616,355 A | 10/1986 | Kasahara | |
| 4,891,799 A | 1/1990 | Nakano | |
| 5,177,724 A | 1/1993 | Gelbart | |
| 5,561,654 A * | 10/1996 | Hamilton et al. | 369/97 |
| 5,650,986 A | 7/1997 | Lee et al. | |
| 5,661,704 A | 8/1997 | Van Rosmalen | |
| 5,898,652 A * | 4/1999 | Makigaki et al. | 369/44.16 |
| 5,949,590 A | 9/1999 | Hong | |
| 6,343,053 B1 * | 1/2002 | Akanuma et al. | 369/44.14 |
| 6,785,063 B2 | 8/2004 | Peng et al. | |
| 2005/0083600 A1 | 4/2005 | Mahnad et al. | |
| 2005/0083601 A1 | 4/2005 | Mahnad et al. | |
| 2005/0083602 A1 | 4/2005 | Saliba et al. | |
| 2005/0094308 A1 | 5/2005 | Mahnad et al. | |
| 2010/0135129 A1 | 6/2010 | Mahnad | |
| 2010/0135136 A1 | 6/2010 | Mahnad | |
| 2010/0135139 A1 | 6/2010 | Kearnan et al. | |
| 2010/0136151 A1 | 6/2010 | Mahnad et al. | |

OTHER PUBLICATIONS

International Search Report and Written Opinion for PCT/US2012/036991 dated Sep. 3, 2012.

* cited by examiner

*Primary Examiner* — Nathan Danielsen
(74) *Attorney, Agent, or Firm* — Brooks Kushman P.C.

(57) ABSTRACT

A suspension system is provided for an objective lens housing. The objective lens housing is supported by the suspension system and is moved in either a tracking direction Y or focusing direction Z by an electro-magnetic actuator. The objective lens housing is supported by upper and lower suspension springs. The suspension springs are moveable in the tracking direction by flexing the suspension springs and are moveable in a focusing direction by compressing a front portion and a back portion to fold the suspension spring at bends formed in an intermediate portion of the suspension springs.

7 Claims, 3 Drawing Sheets

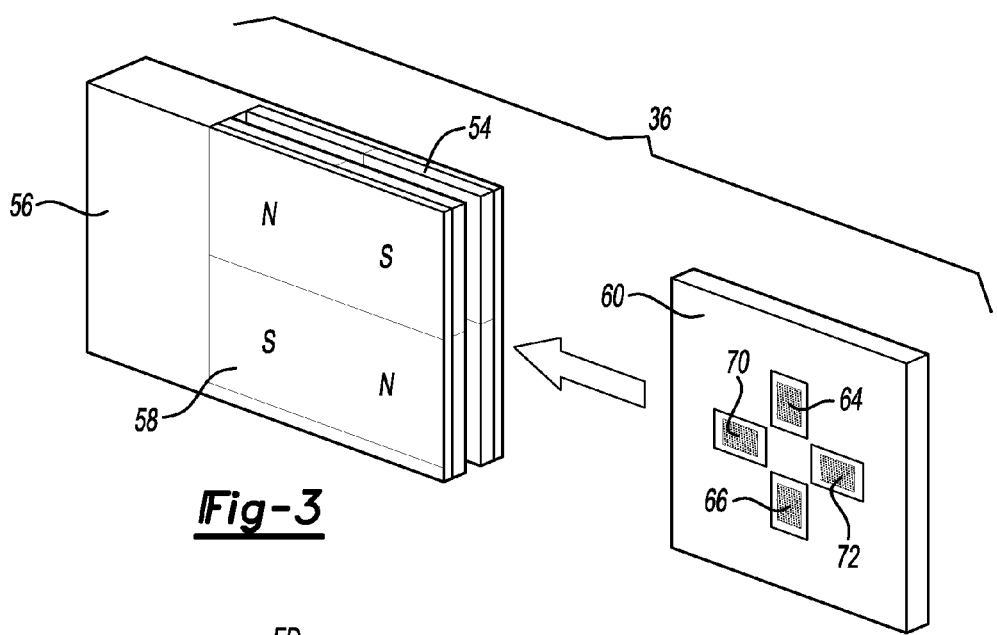
Fig-3
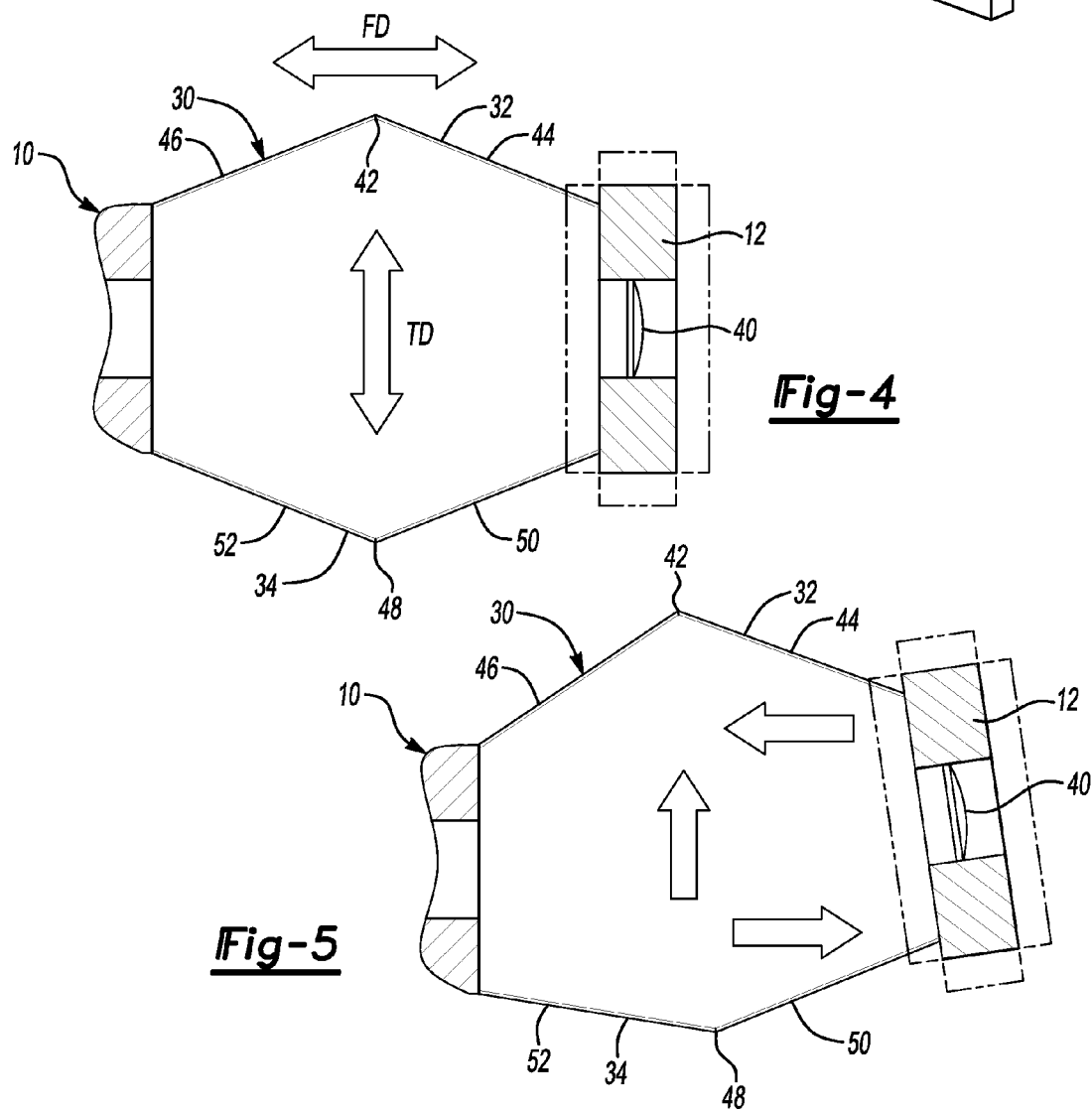
Fig-4
Fig-5

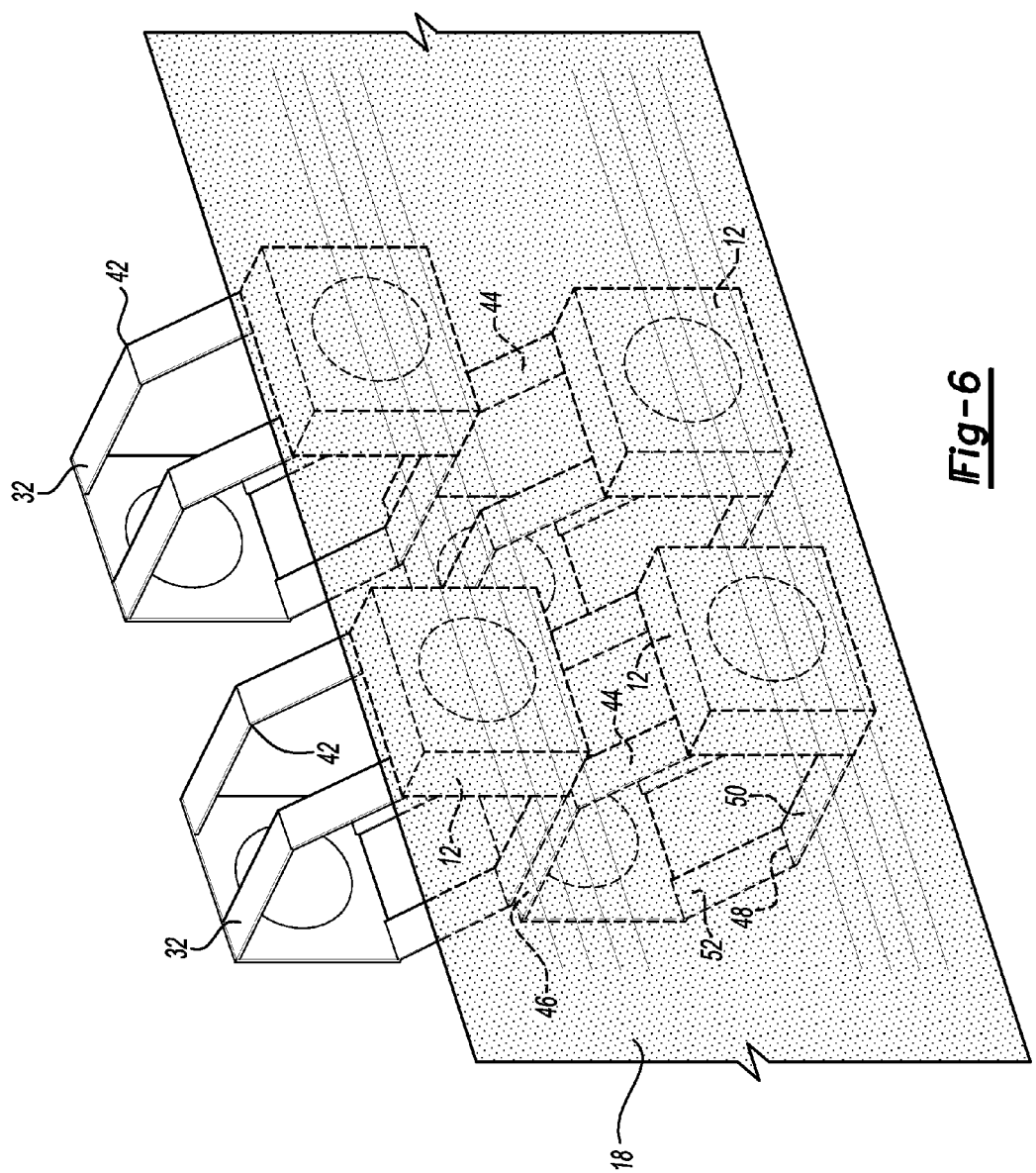

SUSPENSION SYSTEM FOR AN OPTICAL PICKUP ASSEMBLY

TECHNICAL FIELD

The present invention relates to a suspension for a narrow profile focus and tracking actuator for an optical tape pickup unit.

BACKGROUND

Optical pickup units are used in optical data tape storage machines to read and write data on an optical tape.

Conventional focusing and tracking actuators for optical pickup units include an objective lens that may be supported on suspension wires that extend between permanent magnets. Electromagnetic coils may be actuated to move the objective lens in conjunction with the suspension wires. Such prior art focus and tracking lens actuators tend to be bulky and do not lend themselves to assembling a large number of optical pickup units along a limited length of a tape stabilizer.

Applicant's invention is directed to solving the problem of maximizing the number of optical pickup units along the limited length of a tape/stabilizer in an optical tape drive storage machine.

SUMMARY

According to one aspect of the present invention, a suspension system is provided for an optical pickup assembly having an objective lens that is used to read and write data to a surface of an optical data storage tape which moves in a tape path direction X. The actuator system comprises first and second suspension springs that bend in a direction Y that is perpendicular to the tape path direction X and parallel to the surface of the tape. Each spring has a bend extending transversely across the spring that facilitates compression of the spring in a direction Z that is normal to the surface of the tape. The objective lens is supported by the first and second suspension springs that are secured to the objective lens at opposed locations that are in alignment with an axis extending in the Y direction. An electromagnetic actuator is operatively connected to the objective lens and a controller provides signals to the actuator for moving the objective lens in the Y and Z directions.

According to other aspects of the invention, a plurality of first and second suspension springs may be used to support the objective lens. The first and second set of suspension springs may be a pair of flat steel springs. The actuator may include a focusing coil and a tracking coil that are co-planar and that act upon a plurality of permanent magnets to move the objective lens in the Y and Z directions. The focusing coil and tracking coil may be actuated at the same time to tilt the objective lens relative to the surface of the tape. Alternatively, two separate electromagnetic actuators may be provided with one being a tracking actuator including a coil and a permanent magnet that move the objective lens in the Y direction and the other being a focusing actuator including a coil and a permanent magnet that move the objective lens in the Z direction.

According to another aspect of the invention, a suspension system is provided for a pick-up assembly that includes a transducer used to read and write data to a data storage tape that moves in a direction X. The suspension system comprises a spring that is connected to a first side of the transducer and to the pick-up assembly. Another spring is connected to a second side the transducer and to the pick-up assembly. The springs are flexible in a Y direction that is perpendicular to the X direction and parallel to a surface of the tape. The first and second sides of the transducer are aligned in the Y direction. The springs are articulated to be moved in a Z direction that is normal to the surface of the tape.

According to other aspects of the invention, a plurality of springs may be connected to the first side of the transducer and a plurality of springs may also be connected to the second side of the transducer. The springs may be flat steel springs. The pick-up assembly may further comprise an actuator that includes a focusing coil and a tracking coil that are co-planar and that act upon a plurality of permanent magnets to move the transducer in the Y and Z directions. The focusing coil and tracking coil may be actuated at the same time to tilt the transducer relative to the surface of the tape. Alternatively, the pick-up assembly may further comprise a tracking actuator including a coil and a permanent magnet that move the transducer in the Y direction and a focusing actuator including a coil and a permanent magnet that move the transducer in the Z direction. The transducer may be an objective lens and the data storage system may be an optical data tape storage system that reads and writes data to the data storage tape.

According to another aspect of the invention an optical data storage machine is provided that has a suspension system and actuator for moving an objective lens in tracking and focusing directions. The optical data storage machine includes a laser projector that directs light through an objective lens toward an optical tape and a photo diode integrated circuit that receives light reflected from the optical tape through the objective lens. The machine generates an electronic signal to a means for moving the objective lens in the tracking direction and in the focusing direction. The machine also includes means for suspending the objective lens to be movable in a tracking direction and in a focusing direction.

According to other aspects of the invention as it relates to a data storage machine, the means for suspending the objective lens may comprise first and second suspension springs that bend in a direction Y that is perpendicular to a tape path direction X and parallel to a surface of the tape. Each suspension spring has a bend extending transversely across the spring that facilitates compression of the spring in a direction Z that is normal to the surface of the tape. The objective lens is supported by the first and second suspension springs that are secured to the objective lens at opposed locations that are in alignment with an axis extending in the Y direction. The suspension springs may be flat steel springs.

According to further aspects of the invention as it relates to means for moving the objective lens, an electromagnetic actuator may be provided that includes a focusing coil and a tracking coil that act upon a plurality of permanent magnets to move the objective lens in the Y and Z directions. The focusing coil and tracking coil may be actuated at the same time to tilt the objective lens relative to the surface of the tape. The means for moving the objective lens may further comprise a controller that provides signals to the electromagnetic actuator for moving the objective lens in the Y and Z directions.

BRIEF DESCRIPTION OF THE DRAWINGS

FIG. 3 is an exploded perspective view of an electro-magnetic actuator;

FIG. 4 is a diagrammatic cross-sectional view of an objective lens housing supported on an optical pick-up assembly having upper and lower sets of suspension springs with phantom lines showing exaggerated movement ranges;

FIG. 5 is a diagrammatic cross-sectional view showing the actuator assembly positioning the objective lens housing in the tilted orientation; and FIG. 6 is a diagrammatic perspective view of a plurality of actuator assemblies being shown in position relative to an optical data storage tape.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional de tails disclosed in this application are not to be interpreted as limiting, but merely as a representative basis for teaching one skilled in the art how to practice the invention.

Figure 1:
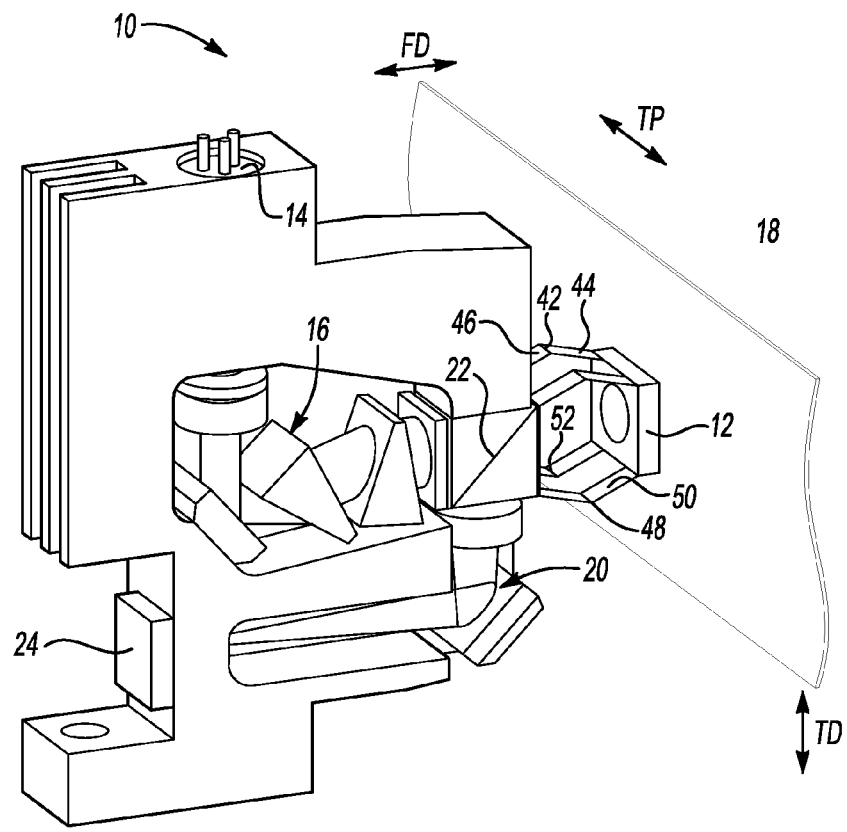
FIG. 1 is a perspective view of an optical pick-up assembly and optical data storage tape made according to one embodiment of the present invention.

Referring to FIG. 1, an optical pick-up assembly 10 is shown with an objective lens housing 12. A laser 14 projects light through a projection lens set 16 to an optical data storage tape 18. The laser light is reflected off of the reflection lens set 20 through a polarizing beam splitter 22 (through which the light was initially transmitted by the projection lens set 16) that directs the lens through the reflection lens set 20 to the photo diode integrated circuit 24.

The optical data storage tape 18 is moved in a tape path direction TP which may also be referred to as the direction X. The objective lens housing 12 is designed to be moveable in a tracking direction TD, or Y direction. The objective lens housing 12 is also moveable in a focusing direction FD, or direction Z.

Figure 2:
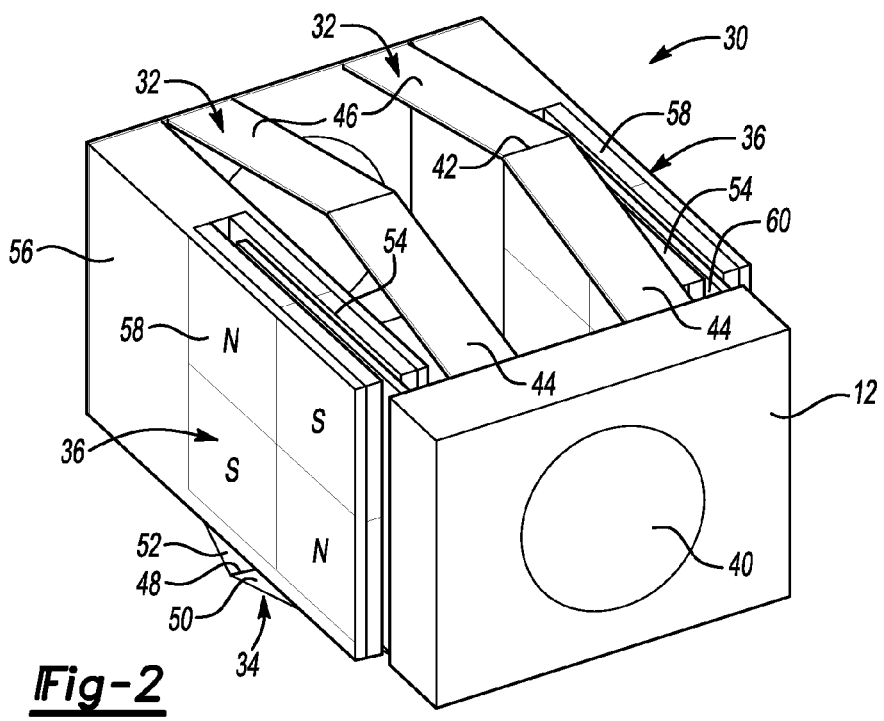
FIG. 2 is a front perspective view of an actuator assembly for positioning an objective lens of an optical pick-up assembly.

Referring to FIGS. 1 and 2, the actuator assembly 30, or actuator system, is shown in greater detail. A pair of upper suspension springs 32 and lower suspension springs 34 support the mass of the objective lens housing 12 in the desired position in front of the optical pick-up assembly 10. Referring to FIG. 2, two electro-magnetic actuators 36 are used to move the objective lens housing 12 in either the tracking direction Y or the focusing direction Z.

A lens 40 is disposed within the objective lens housing 12. In one embodiment of the present invention, the upper suspension springs 32 are provided with a bend 42, or fold, between a front portion 44 and a back portion 46 of the upper suspension springs 32. The suspension springs are preferably formed of steel and are flexible in the Y direction to permit the objective lens housing 12 to be moved in the Y or tracking direction. The bend 42 allows the upper suspension springs 32 to move in the Z or focusing direction. Similarly, a bend 48 is provided in the lower suspension springs 34. A front portion 50 and back portion 52 are provided on opposite sides of the bend 48 to facilitate movement of the objective lens housing 12 as previously described with reference to the upper suspension springs 32. Alternatively, arcuate suspension springs could be provided instead of providing flat suspension springs with a bend in an alternative embodiment of the invention.

Referring to FIG. 3, an electro-magnetic actuator 36 is shown in an exploded perspective view. As previously indicated, two electro-magnetic actuators 36 are provided on opposite sides of the actuator assembly 30. This description is of a single electro-magnetic actuator 36 wherein each includes an inner set of permanent magnets 54 that are designated according to their polarity N or S in four different quadrants. The inner permanent magnet 54 is secured or assembled to a base 56. An outer permanent magnet 58 is also marked according to the polarity of permanent magnets N and S in the four quadrants of the outer permanent magnets 58. A planar substrate 60 is shown separated from the electro-magnetic actuator 36. An upper tracking coil 64 and a lower tracking coil 66 are shown in a vertically spaced relationship. An inner focusing coil 70 and an outer focusing coil 72 are shown in a horizontally spaced relationship. The actuator 36, the four permanent magnets of the inner set of permanent magnets 54 and the outer permanent magnets 58 with each pole of the permanent magnets being adjacent to a quadrant having a different polarity. The N pole of the permanent magnets and the S pole of the permanent magnet are arranged to be opposite the planar substrate 60 for generating flux lines in the X axis direction. The tracking coils 64, 66 and focusing coils 70, 72 are generally rectangular in shape and both sides of each coil is opposite a different pole. The magnetic flux lines generated by the permanent magnets pass through the focusing coils 70, 72 and the tracking coils 64, 66. Focusing movement of the actuator 36 is performed by providing current through the focusing coils 70, 72. The direction of current flow through the focusing coils 70, 72 may be used to move the substrate 60 and the objective lens housing 12 to which the substrate 60 is connected in the opposite direction.

Current may be provided to the tracking coils 64, 66. Magnetic flux lines generated by the permanent magnets pass vertically through the left and right sides of the tracking coils 64, 66 to move the substrate 60 and the objective lens housing 12 in the tracking direction or in the Y axis direction. Current may be reversed to move the objective lens housing 12 in the opposite direction.

Referring to FIG. 4, the actuator assembly 30 is shown supporting the objective lens housing 12 in a generally neutral position. The upper suspension spring 32 is shown with a front portion 44 and a back portion 46 on opposite sides of the bend 42. The lower suspension springs 34 are shown with a front portion 50 and a back portion 52 being separated by the bend 48. As shown in FIG. 4, the objective lens housing 12 is centered relative to the optical pick-up assembly 10. In this position, it is possible to move the objective lens housing 12 in either the tracking direction TD or the focusing direction FD by actuating the coils of the electro-magnetic actuator 36 shown in FIG. 3.

Referring to FIG. 5, the actuator assembly 30 is shown tilting the objective lens housing 12 by selectively providing current to the tracking coils 64 and 66 with opposite polarity while also providing current in the tracking direction. With this specialized actuation of the actuator 36, it is possible to tilt the objective lens housing 12. Otherwise, balance and actuation of the tracking coils 64, 66 and focusing coils 70, 72.

Referring to FIG. 6, a set of four objective lens housings 12 are shown diagrammatically adjacent to an optical data storage tape 18. The objective lens housings 12 are supported on the upper suspension springs 32 and lower suspension springs 34 and may be individually adjusted in both the tracking direction and focusing direction by actuators shown in FIG. 3, but are not shown in FIG. 6 to better show the suspension springs 32 and 34. As previously described, the upper suspension springs 32 have a bend 42 that divides the front portion 44 from the back portion 46 of the upper suspension spring 32. The lower suspension springs 34 have a bend 48 between the front portion 50 and back portion 52 of the lower suspension springs 34. Optical pick-up assemblies are not shown in FIG. 6, but an example is shown in FIG. 1 of one embodiment of an optical pick-up assembly 10. Each of the objective lens housings 12 may be adjusted as previously described and the narrow width of the actuator assemblies 40 permits them to be stacked side-by-side and vertically as shown in this figure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A suspension system for an optical pickup assembly having an objective lens that is used to read and write data to a surface of an optical data storage tape which moves in a tape path direction X, the suspension system comprising:

a plurality of first suspension springs and a plurality of second suspension springs that bend in a direction Y that is perpendicular to the tape path direction X and parallel to the surface of the tape, wherein the first suspension springs are a pair of flat steel springs and the second suspension springs are a pair of flat steel springs, wherein the steel springs each have a planar front portion and a planar back portion that intersect at a fold, wherein each spring has a bend extending transversely across the spring that facilitates compression of the spring in a direction Z that is normal to the surface of the tape, wherein the objective lens is supported by the first and second suspension springs that are secured to the objective lens at opposed locations that are in alignment with an axis extending in the Y direction;

an electromagnetic actuator that is operatively connected to the objective lens, wherein the actuator includes a planar substrate, a pair of focusing coils attached to the planar substrate that are aligned in the Z direction, a pair of tracking coils attached to the planar substrate that are aligned in the Y direction, an inner set of permanent magnets arranged in a plane in four quadrants with adjacent magnets having opposite poles facing a first side of the planar substrate, an outer set of permanent magnets arranged in a plane in four quadrants with adjacent magnets having opposite poles facing a second side of the planar substrate, wherein the planar substrate is disposed between the inner and outer set of permanent magnets with the focusing coils and the tracking coils being wholly disposed between the permanent magnets; and a controller that provides signals to the electromagnetic actuator for moving the objective lens in the Y and Z directions.

2. The suspension system of claim 1 wherein the a focusing coils and the tracking coils are co-planar and that act upon the permanent magnets to move the objective lens in the Y and Z directions.

3. The suspension system of claim 2 wherein the focusing coil and tracking coil may be actuated at the same time to tilt the objective lens relative to the surface of the tape.

4. A suspension system for an optical pickup assembly having an objective lens that is used to read and write data to a surface of an optical data storage tape which moves in a tape path direction X, the suspension system comprising:

first and second suspension springs that bend in a direction Y that is perpendicular to the tape path direction X and parallel to the surface of the tape, wherein each spring has a bend extending transversely across the spring that facilitates compression of the spring in a direction Z that is normal to the surface of the tape, wherein the objective lens is supported by the first and second suspension springs that are secured to the objective lens at opposed locations that are in alignment with an axis extending in the Y direction;

two separate electromagnetic actuators are provided with a first actuator being provided on a first side of the suspension system and a second actuator being provided on a second side of the suspension system, wherein both actuators are operatively connected to the objective lens, wherein the actuator includes a planar substrate, a pair of focusing coils attached to the planar substrate that are aligned in the Z direction, a pair of tracking coils attached to the planar substrate that are aligned in the Y direction, an inner set of permanent magnets arranged in a plane in four quadrants with adjacent magnets having opposite poles facing a first side of the planar substrate, an outer set of permanent magnets arranged in a plane in four quadrants with adjacent magnets having opposite poles facing a second side of the planar substrate, wherein the planar substrate is disposed between the inner and outer set of permanent magnets with the focusing coils and the tracking coils being wholly disposed between the permanent magnets; and a controller that provides signals to the electromagnetic actuator for moving the objective lens in the Y and Z directions.

5. An optical data storage machine comprising:

a laser projector that directs light through an objective lens toward an optical tape;

a photo diode integrated circuit that receives light reflected from the optical tape through the objective lens and generates an electronic signal;

means for suspending the objective lens for the light to be directed through the lens toward the optical tape and reflected from the optical tape to be movable in a tracking direction Y and in a focusing direction Z; and means for moving the objective lens in the tracking direction Y and in the focusing direction Z, wherein the means for moving the objective lens includes an actuator that moves the objective lens, wherein the actuator includes a planar substrate, a pair of focusing coils attached to the planar substrate that are aligned in the Z direction, a pair of tracking coils attached to the planar substrate that are aligned in the Y direction, an inner set of permanent magnets arranged in a plane in four quadrants with adjacent magnets having opposite poles facing a first side of the planar substrate, an outer set of permanent magnets arranged in a plane in four quadrants with adjacent magnets having opposite poles facing a second side of the planar substrate, wherein the planar substrate is disposed between the inner and outer set of permanent magnets with the focusing coils and the tracking coils being wholly disposed between the permanent magnets.

6. The optical data storage machine of claim 5 wherein the focusing coil and tracking coil may be actuated at the same time to tilt the objective lens relative to the surface of the tape.

7. The optical data storage machine of claim 5 wherein the means for moving the objective lens further comprises a controller that provides signals to the electromagnetic actuator for moving the objective lens in the Y and Z directions.

* * * * *

UNITED STATES PATENT AND TRADEMARK OFFICE
CERTIFICATE OF CORRECTION

| | | |
|---|---|---|
| PATENT NO. | : 8,514,675 B2 | Page 1 of 1 |
| APPLICATION NO. | : 13/105481 | |
| DATED | : August 20, 2013 | |
| INVENTOR(S) | : Mahnad | |

It is certified that error appears in the above-identified patent and that said Letters Patent is hereby corrected as shown below:

In the Claims

In column 5, line 53, in Claim 2, delete "the a" and insert -- the --, therefor.

Signed and Sealed this
Third Day of December, 2013

Margaret A. Focarino
*Commissioner for Patents of the United States Patent and Trademark Office*